(12) United States Patent
Nakano et al.

(10) Patent No.: US 6,588,667 B1
(45) Date of Patent: Jul. 8, 2003

(54) DATA READING APPARATUS

(75) Inventors: Kunio Nakano, Hachioji (JP); Iwao Aizawa, Hachioji (JP)

(73) Assignee: Konica Corporation (JP)

( * ) Notice: Subject to any disclaimer, the term of this patent is extended or adjusted under 35 U.S.C. 154(b) by 312 days.

(21) Appl. No.: 09/620,883

(22) Filed: Jul. 21, 2000

(30) Foreign Application Priority Data

Jul. 22, 1999 (JP) .......................................... 11-207815

(51) Int. Cl.[7] .............................. G06F 17/00; G06K 7/10
(52) U.S. Cl. ........................ 235/462.15; 235/462.41; 235/375
(58) Field of Search ................. 235/462.11, 462.15, 235/462.41, 462.24, 375, 379, 380; 348/222.1, 223.1, 652, 207.1, 231.3, 231.7, 231.9; 382/115

(56) References Cited

U.S. PATENT DOCUMENTS

| | | | | |
|---|---|---|---|---|
| 4,305,059 A | * | 12/1981 | Benton | 235/379 |
| 4,454,414 A | * | 6/1984 | Benton | 235/379 |
| 5,448,045 A | * | 9/1995 | Clark | 235/382 |
| 5,841,868 A | * | 11/1998 | Helbig, Sr. | 235/380 |
| 6,087,955 A | * | 7/2000 | Gray | 235/379 |
| 6,421,462 B1 | * | 7/2002 | Christian et al. | 382/219 |
| 2001/0005222 A1 | * | 6/2001 | Yamaguchi | 348/223 |

* cited by examiner

Primary Examiner—Thien M. Le
Assistant Examiner—April Nowlin
(74) Attorney, Agent, or Firm—Cantor Colburn LLP

(57) ABSTRACT

A data reading apparatus, includes an apparatus connecting terminal to which an external apparatus is connected; a reader to read data information or directly information recorded in a recording medium; a first memory to store specific information to confirm whether or not specific data information or specific directory information is recorded in the recording medium; a judging section to compare the specific information with the data information or the directory information read from the recording medium, to judge whether or not the specific information conforms with the data information or the directory information, and to indicate a conforming case or a nonconforming case as a judgement result; and a controller to control a working mode such that a first working mode is conducted in the conforming case and a second working mode different from the first working mode is conducted in the nonconforming case when the data information recorded in the recording medium is handled from the external.

9 Claims, 4 Drawing Sheets

DATA READING APPARATUS

BACKGROUND OF THE INVENTION

The present invention relates to a data reading apparatus, in particular, to a data reading apparatus capable of protecting data information at the time of being used to read a recording medium usable in several apparatus.

Recently, there has been used a memory card capable of being inserted in or pulled out from a device such as a computer, an electronic pocketbook, an IC voice recorder and a digital still camera.

In a computer in which there is not provided a slot for the above memory card, a data reading apparatus is connected to a serial port of the computer in order to conduct reading or writing for the memory card.

From the computer connected with the data reading apparatus, it become possible to read, write or renew freely data stored in the memory card.

Owing to the data reading apparatus, with regard to data information and a directory structure of an image acquired by photography with a digital still camera, it becomes also possible for the computer to renew them by freely rewriting them.

However, since the data information of the image acquired by the digital still camera has a specific directory structure or a specific file structure, there may happen the problem that after the image was rewritten by the computer, the image could not be used by the digital still camera.

Incidentally, the above problem may happen not only between the digital still camera and the computer, but also may happen among various apparatus in which data information is not handled by the same manner.

Further, the above problem may happen not only in the memory card, but also may happen in various kinds of removable recording medium such as a hard disk and a mini disk.

SUMMARY OF THE INVENTION

The present invention has been achieved in the view of the above problem. The object of the invention is to provide a data reading apparatus capable of protecting data information at the time of reading a recording medium usable in several apparatus.

The above object can be attained by the following structures.

(1) A data reading apparatus, comprises an apparatus connecting terminal to which an external apparatus is connected;

a reader to read data information or directory information recorded in a recording medium;

a first memory to store specific information to confirm whether or not specific data information or specific directory information is recorded in the recording medium;

a judging section to compare the specific information with the data information or the directory information read from the recording medium, to judge whether or not the specific information conforms with the data information or the directory information, and to indicate a conforming case or a nonconforming case as a judgment result; and a controller to control a working mode such that a first working mode is conducted in the conforming case and a second working mode different from the second working mode is conducted in the nonconforming case when the data information recorded in the recording medium is handled from the external apparatus.

In the present invention, the retained specific information is compared with the data information or the directory information read from the recording medium. Between the conforming case and the nonconforming case in the comparison result, a working mode at the time that the data information recorded in the recording medium is handled from an external apparatus is changed. Therefore, by structuring the data reading apparatus such that information regarding the data information to be protected is retained as the specific information and the working mode in the nonconforming case is made a mode to limit the external apparatus to handle the data information, the data information can be protected at the time of reading the recording medium usable in several apparatus.

(2) In a data reading apparatus provided with recording medium connecting terminals to which a recording medium is connected and apparatus connecting terminals to which an external apparatus is connected, to read data information recorded in the recording medium and to transmit the data information to the external apparatus, it may be preferable to structure the data reading apparatus so as to comprise:

reading means for reading the data information or directory information recorded in the recording medium;

specific information storing means for storing specific information to confirm whether or not specific data information or specific directory information is recorded in the recording medium;

judging means for judging a conforming case or a nonconforming case by comparing the specific information with the data information or the directory information read from the recording medium; and control means for changing between the conforming case and the nonconforming case a working mode when the data information is handled from the external apparatus.

(3) In the data reading apparatus of (1), when the data information recorded in the recording medium is handled from the external apparatus, the controller applies a limitation to the handling as a limiting mode which is conducted as one of the first working mode and the second working mode and does not apply the limitation to the handling as a non limiting mode which is conducted as the other one of the first working mode and the second working mode.

(4) In a data reading apparatus provided with recording medium connecting terminals to which a recording medium is connected and apparatus connecting terminals to which an external apparatus is connected, to read data information recorded in the recording medium and to transmit the data information to the external apparatus, it may be preferable to structure the data reading apparatus so as to comprise:

reading means for reading the data information or directory information recorded in the recording medium;

specific information storing means for storing specific information to confirm whether or not specific data information or specific directory information is recorded in the recording medium;

judging means for judging a conforming case or a nonconforming case by comparing the specific information with the data information or the directory information read from the recording medium; and control means for conducting in the conforming case a limiting mode to apply a limitation when the data information is handled from the external apparatus and for conducting in the nonconforming case a non limitation mode not to apply the limitation when the data information is handled from the external apparatus.

As a result of comparison that the retained specific information is compared with the data information or the directory information read from the recording medium, in the conforming case, a limitation is applied when the data information is handled from the external apparatus, on the other hand, in the nonconforming case, no limitation is applied when the data information is handled from the external apparatus. Therefore, by retaining information regarding the data information to be protected as the specific information, the data information can be protected at the time of reading the recording medium usable in several apparatus.

(5) In the data reading apparatus of (3) or (4), it may be preferable to provide limiting information storing means for storing limiting information regarding the application of the limitation when the data information is handled from the external apparatus and to transmit the limiting information to the external apparatus in the limiting mode.

With above structure, the limiting information indicating an existence of the limitation for the handling for the data information is transmitted to the external apparatus, the reading out or the renewing from the external apparatus is limited. Therefore, the data information can be protected at the time of reading the recording medium usable in several apparatus.

As one embodiment in the case that the limiting information is transmitted to the external apparatus, it may be possible to protect the data information by transmitting only the directory information of the recording medium to the external apparatus.

(6) In the data reading apparatus of (3), (4) or (5), in the limiting mode, at least one of renewing the data information in a region of the recording medium indicated by the specific information and writing in new data information in the region is prohibited.

Since at least one of renewing the data information and writing in new data information in a region of the recording medium indicated by the specific information is prohibited in the limiting mode, the recording medium usable in several apparatus can not change from the external apparatus, whereby the data information can be surely protected. For a region other than the region indicated by the specific information, since the limitation is softened or cancelled, it becomes possible to use the recording medium effectively in plural apparatus.

DETAILED DESCRIPTION OF THE PREFERRED EMBODIMENT

Hereinafter, an embodiment of the present invention is explained in detail.

In the embodiment of the present invention, as a data reading apparatus used to read a recording medium usable in several apparatus, there is explained a concrete embodiment of a data reading apparatus used at the time that the computer reads a memory card as a recording medium in which image information is recorded by a digital still camera.

Firstly, with reference to FIG. 2, the connecting situation of the data reading apparatus in the embodiment of the present invention will now be explained.

Figure 2:
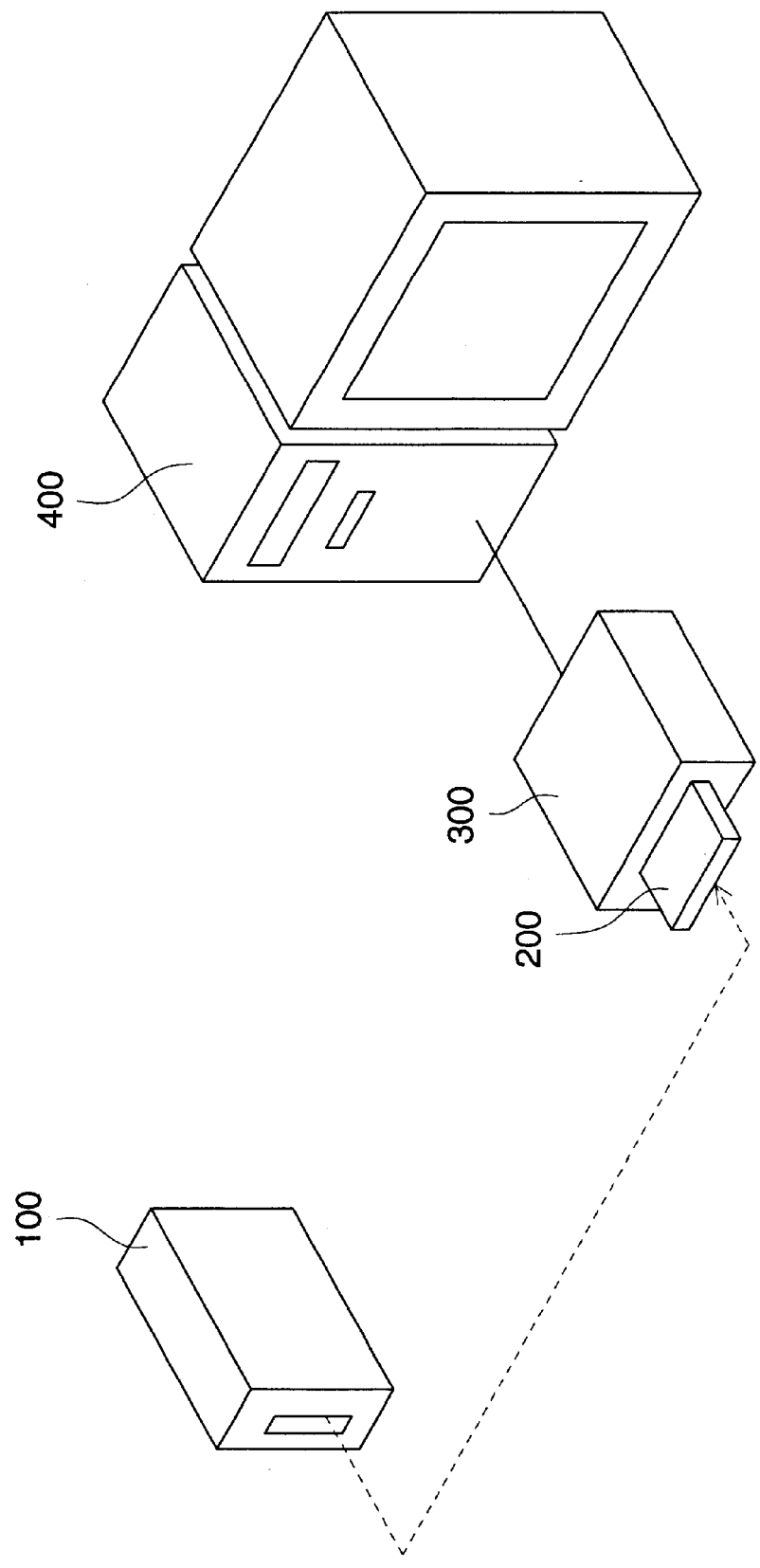
FIG. 2 is an illustration explaining a connecting condition among the data reading apparatus in the embodiment of the invention, an electronic camera and a computer as an external apparatus.

In FIG. 2, digital still camera 100 conducts recording image information in a recording medium 200 such as a memory card. Incidentally, instead of the digital still camera 100, various kinds of handy type electronic appliances to which a digital still camera is attached or in which a digital still camera is incorporated or a video camera capable of recording image information in a memory card may be used.

A data reading apparatus 300 is structured such that the recording medium can be inserted into or pulled out from the data reading apparatus 300. The data reading apparatus 300 is adapted to be electrically connected to a computer 400. In this case, the data reading apparatus 300 may be connected to the computer 400 through one of various data transmitting methods such as serial or parallel ways.

Figure 1:
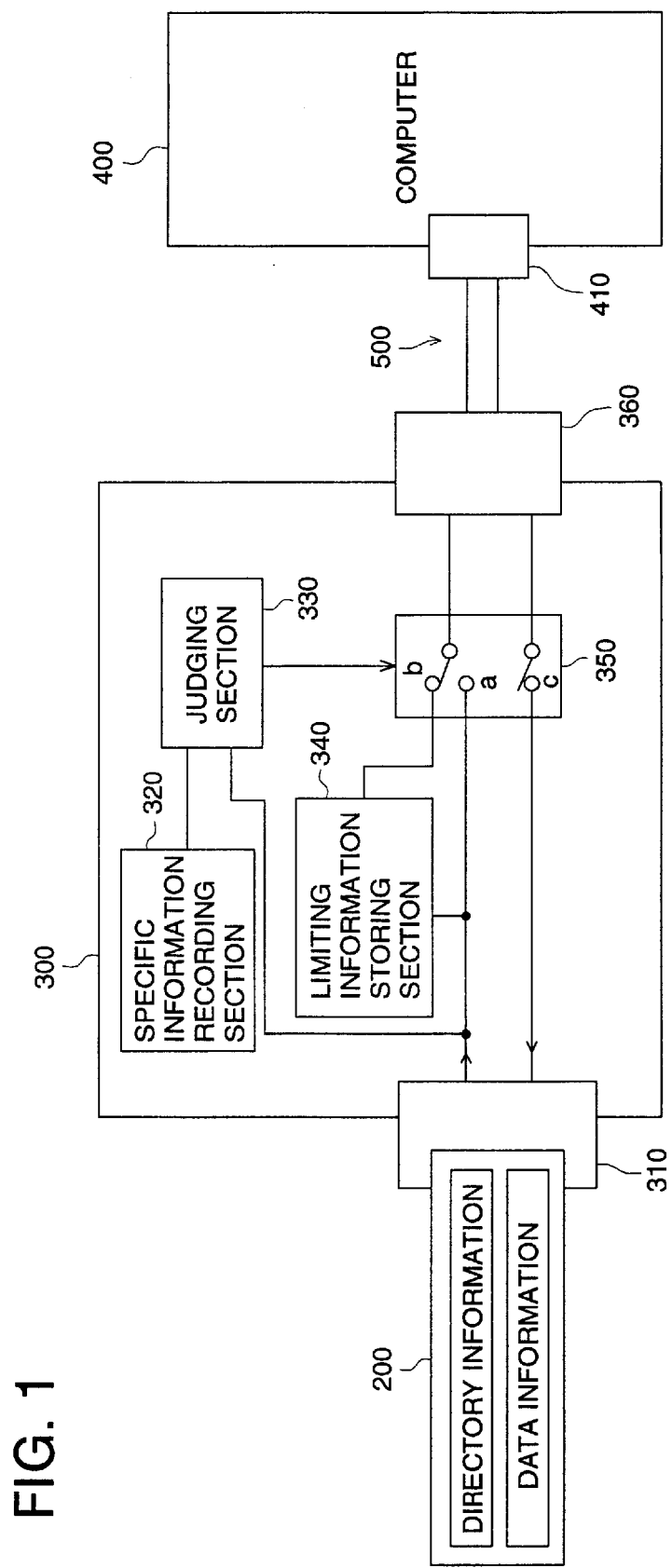
FIG. 1 is a block diagram showing a structure and a connecting condition of a data reading apparatus in an embodiment of the invention.

Next, with reference to FIG. 1, an inner structure of the data reading apparatus 300 is explained in detail. FIG. 1 shows a situation that data information recorded in the recording medium 200 is read through the data reading apparatus 300 by the computer 400 employed as an external apparatus. The computer 400 and the data reading apparatus 300 are connected with a connecting cable 500.

Recording medium connecting terminals 310 are used as terminals to which a recording medium such as a memory card usable for several apparatus is connected. A specific information storing section 320 stores specific data information recorded in the recording medium 200 such as specific information used to confirm whether or not specific data information or directory information is recorded in a recording medium. A judging section 330 compares the specific information with data information or directory information read from the recording medium 200 and judges whether or not the specific information conforms with them. This judging section 330 constitutes reading means and judging means cited in SUMMARY OF THE INVENTION.

A limiting information storing section 340 stores information (hereinafter, referred to as limiting information) instructing to add a limitation when the data information recorded in the recoding medium 200 is used by an external apparatus. It may be preferable that the limiting information storing section 340 stores information indicating the kind of information such as the kind of the directory information and the kind of the data information in addition to the limiting information. A switching control section 350 switches the working mode of the data reading apparatus 300 in accordance with the comparison result by the judging section 330 as follows. In the case that the specific information conforms with the data information or the directory information, the data reading apparatus 300 works in a limiting mode (a second working mode) to provide a limitation when the external apparatus handles the data information recorded in the recording medium 200, for example, limited information is transmitted to the external apparatus. On the other hand, in the case that the specific information does not conform with them, the data reading apparatus 300 works in a non-limiting mode (a first working mode) to provide no limitation when the external apparatus handles the data information recorded in the recording medium 200. Apparatus connecting terminals 360 are terminals to which the external apparatus is connected. In FIG. 1, the computer is connected to the apparatus connecting terminals 360 through a connecting cable 500.

In the recording medium 200, the data information and the directory information regarding the image information photographed by the digital still camera 100 are recorded. Here, the data information represents image data photographed by the digital still camera 100.

The directory information represents the name of a predetermined directory indicating a record in which the data information of a predetermined format is recorded in the recording medium 200 by the digital still camera 100. Namely, in this embodiment, this directory information corresponds to the specific information.

In the specific information storing section 320, several pieces of existing specific information are stored in advance. When new specific information is determined, it may be desirable that the several pieces of specific information in the specific information storing section 320 are renewed.

Needless to say, the specific information is not limited to the example in this embodiment, it may be permissible that there merely exists a certain kind of specific information indicating the fact that the data information of image in a specific format is recorded in the recording medium 200. For example, the data information in compliance with an agreement under DCF (Design Rule For Camera File System) may be used as the specific information.

Hereinafter, a reading action of the data reading apparatus for the recording medium 200 in the present embodiment will explained.

When photography is conducted with the digital sill camera, the data information and the directory information corresponding to the specific information are recorded in the recording medium 200. Incidentally, the directory information is recorded when the recording medium 200 is handled firstly by the digital still camera 100. Thereafter, only data information is newly written into the recording medium 200.

Then, the recording medium 200 in which the data information and the directory information are recorded is inserted into the recording medium connecting terminals of the data reading apparatus 300.

In the data reading apparatus 300, the judging section 330 reads out the directory information or the data information from the recording medium and conducts comparison judgment between the directory information or the data information and the specific information stored in the specific information storing section 320.

As a result of the comparison judgment, in the case that the specific information does not conform with the directory information or the data information, since image information photographed by the digital still camera 100 is not recorded, no limitation is provided when the data information recorded in the recording medium 200 are handled from the computer 400. This mode is defined as the first working mode.

In the case of the first working mode, since no limitation is provided for the access from the computer 400, an internal switch in the switching control section 350 is switched to "a" side in accordance with the instruction from the judging section 330 and information in the recording medium 200 is transmitted to the computer 400. Also, an internal switch "c" in the switching control section 350 is turned to ON condition in accordance with the instruction from the judging section 330.

On the other hand, in the case that the specific information retained in the specific information storing section 320 conforms with the data information or the directory information read from the recording medium 200, since image information photographed by the digital still camera 100 is recorded, a limitation is provided when the data information recorded in the recording medium 200 are handled from the computer 400. This mode is defined as the second working mode.

The limitation for the handling from the computer in this case is applied for confirming the existence of image information or the name of file, reading image information, rewriting (or renewing, updating) image information and writing in new data.

As a result, when image information recorded by the digital still camera 100 exists in the recording medium 200, the handling conducted freely from the computer such as reading, rewriting (renewing) and writing-in is limited. In other word, in the invention, the working mode is changed in accordance with the result of judgment for the content recorded in the recording medium 200, and then the limitation is applied to the handling from the external apparatus if necessary. Whereby it becomes possible to protect data information when a recording medium usable in several apparatus is read out.

As described above, in order to realize the limitation for the handling from the computer 400, in the present embodiment, the limiting information to limit the external apparatus to handle the data information is stored in the limiting information storing section 340. By switching the internal switch in the switching control section 350 to "b" side, the limiting information stored in the limiting information storing section 340 is transmitted to the computer 400. Also, the internal switch in the switching control section 350 "c" is turned to OFF in accordance with the instruction from the judging section 330.

In this case, the directory information and the data information in the recording medium can not be looked from the computer 400 and only the limiting information is looked from the computer 400. That is, there becomes the condition that the computer 400 understands that the access to the recording medium 200 is limited. The above second working mode is defined as the limiting mode in the present embodiment.

Further, as an embodiment in the case that the limiting information is transmitted to the computer 400, it is possible to protect the data information by transmitting only the directory information recorded in the recording medium 200 to the external apparatus. In this case, the computer 400 can look the directory information in the recording medium, however, can not look more than that.

With the above structure, by limiting reading-out or rewriting from the computer 400, it can be possible to surely protect the data information when the recording medium usable in several apparatus is handled from an external apparatus such as the computer 400.

Figure 3:
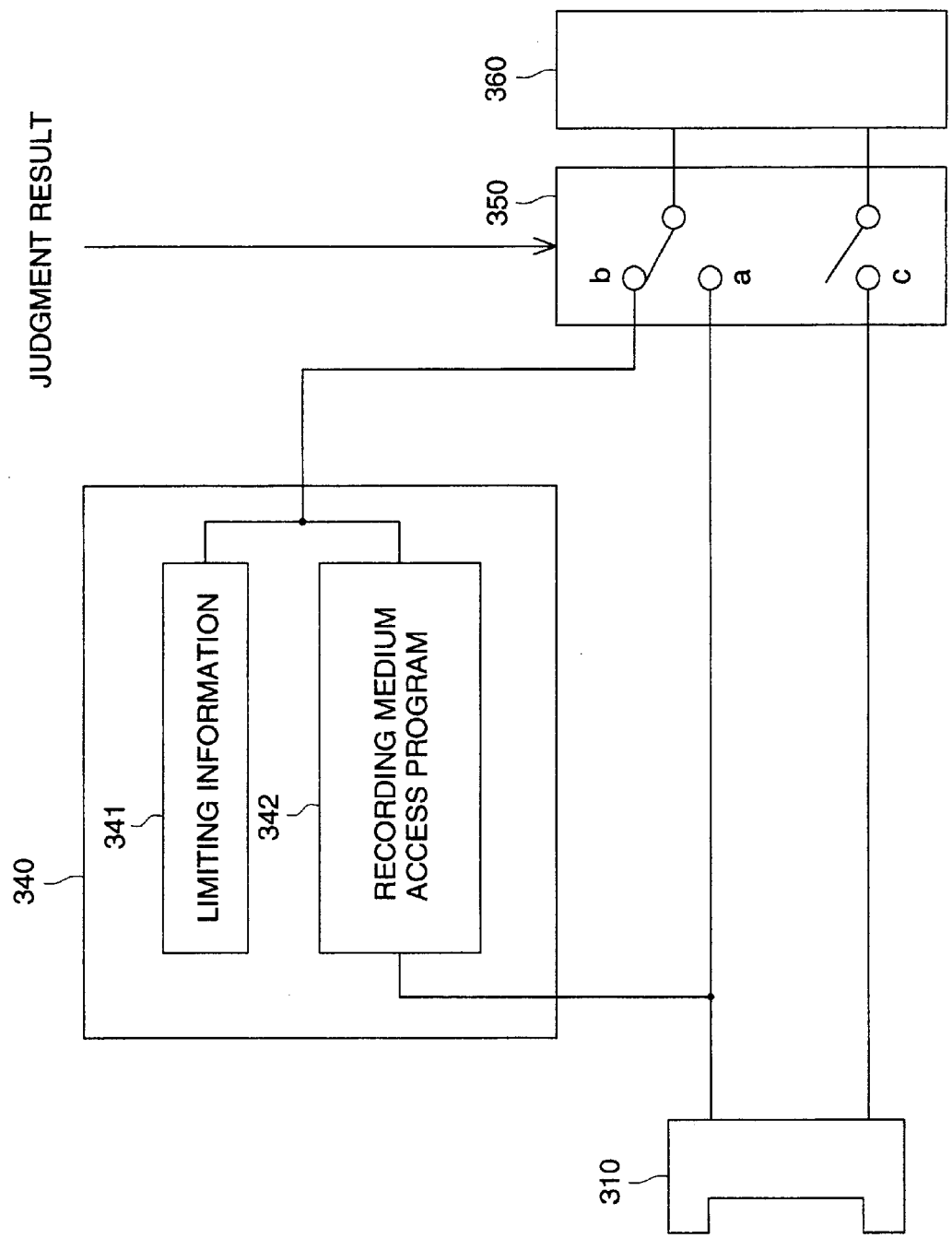
FIG. 3 is an illustration showing a structure of a primary section of the data reading apparatus in the embodiment of the invention.

Further, as shown in FIG. 3, it is possible to store a program (a recording medium accessing program 342) to access the recording medium in the limiting information storing section 340. In this case, there becomes the condition that the directory information or the data information in the recording medium 200 can not be looked directly from the computer 400 and the existence of the limiting information 341 and the recording medium accessing program 342 can be looked from the computer 400. On the above condition, by driving the recording medium accessing program 342 in the limiting information storing section 340 from the computer 400, it becomes possible to access the recording medium indirectly.

In this case, by the action of the recording medium accessing program 342, it becomes possible for the computer 400 to look indirectly the directory information and the data information of the recording medium. However, the computer can not look a portion limited by the limiting information and can look only an allowed portion. Furthermore, in this case, in accordance with the limiting information, it becomes possible to provide a limitation or a permission stepwise for reading out the data information, rewriting the data information and writing new data information respectively.

By limiting the reading or the rewriting from the computer 400, it can be possible to surely protect the data information when the recording medium usable in several apparatus is handled from an external apparatus such as the computer 400.

Further, in the limiting mode in this embodiment, it is possible to prohibit at least one of rewriting data information within a range indicated by the specific information and writing new data information.

Figure 4:
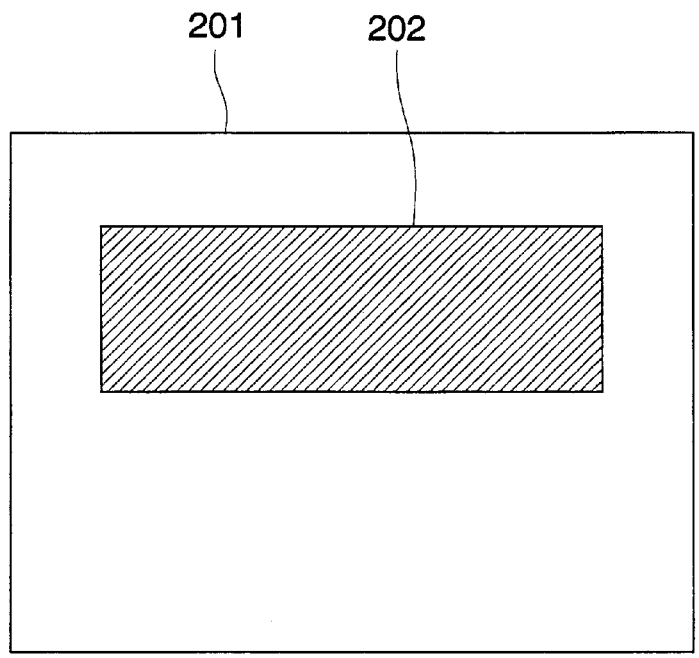
FIG. 4 is an illustration showing a situation in which an area on a recording medium used in the embodiment of the invention is limited.
Figure 4:
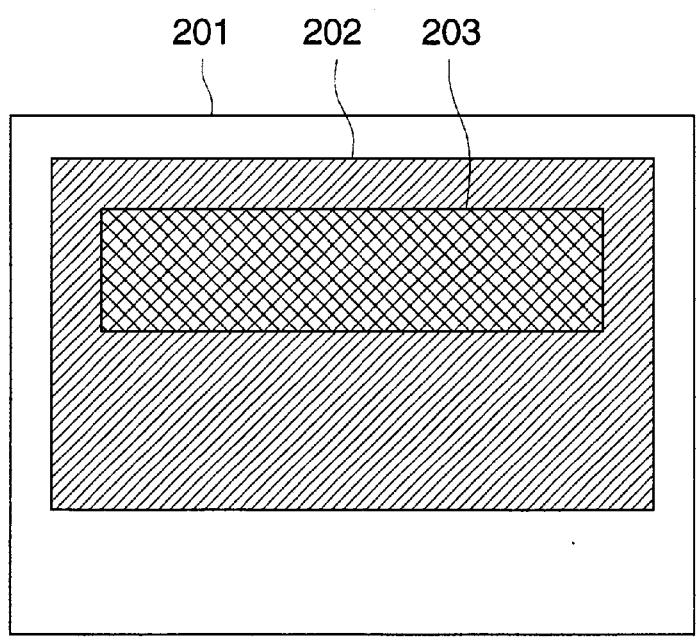

In FIG. 4(a), the entire recording region 201 in the recording medium is illustrated. For a region 202 indicated with hatching, at least one of the reading-out, the rewriting and the writing-in from the computer 400 are prohibited. For a region other than the hatched regions 202, there is no limitation for the reading-out, the rewriting and the writing-in from the computer 400. In this case, in accordance with the limiting situations, the content of the limitation and the limited region are stored as the limiting information in the limiting information storing section 340.

Further, in FIG. 4(b), the entire recording region 201 in the recording medium is illustrated. For a region 202 indicated with hatching, only reading out from the computer 400 is permitted and rewriting the data information and writing in new data information are prohibited. For a region 203 indicted with double hatching, all of the reading-out, the rewriting and the writing-in from the computer 400 are prohibited. For a region other than the hatched regions 202 and 203, there is no limitation for the reading-out, the rewriting and the writing-in from the computer 400. In the case that the limitations are applied separately stepwise, the content of the limitation and the limited region of each of the limitations are stored as the limiting information in the limiting information storing section 340.

Incidentally, in FIGS. 4(a) and 4(b), the recording regions are illustrated. However, the limitation for the access from the computer 400 as an external apparatus to the recording medium 200 may be administrated on the basis of the address of the recording region or on the basis of the directory structure. In the case that the limitation is provided on the basis of the directory structure, a permission or a prohibition with regard to the reading-out, the rewriting and the writing-in may be determined for image information belonging the predetermined directory.

In the above embodiment, since at least one of the reading-out, the rewriting and the writing-in is prohibited for the data information in a region indicated by the specific information in the limiting mode, a predetermined region in the recording medium usable several apparatus can be changed from the external apparatus, whereby the data information can be surely protected.

Further, for a region other than the region indicated by the specific information, since the limitation is softened or removed, the recording medium can be used effectively from a plurality of external apparatus while keeping the data information to be protected.

Incidentally, in the above embodiment, if the recording medium connecting terminals 310 are not needed, a reading apparatus for CD-RW as one example may be used as the data reading apparatus 300.

Further, in the above embodiment, information regarding the data information to be protected is stored as the specific information in the specific information storing section 320, and in the case that the specific information conforms the directory information or the data information recorded in the recording medium 200, the limitation is applied. With this structure, information to be protected specifically can be surely protected. In the case that data information permitted to be not protected is inserted in the data reading apparatus 300, it is possible to avoid the problem that data in the recording medium cannot be handled. Further, it is also possible to structure as follows. Information regarding the data information permitted to be not protected is stored as specific information in the specific information storing section 320, and then in the case that the specific information conforms with the directory information or the data information recorded in the recording medium 200, no limitation is applied. On the other hand, in the case that the specific information does not conform with them, a limitation is applied. In the case, when a recording medium including information to be protected is inserted into the data reading apparatus before the specific information in the specific information storing section 320 is renewed, it can be possible to avoid the problem that the data in the recording medium are rewritten unexpectedly.

What is claimed is:

1. A data reading apparatus, comprising:
   an apparatus connecting terminal to which an external apparatus is connected;
   a recording medium connecting terminal to which a recording medium is connected;
   a reader to read data information or directory information recorded in the recording medium connected to the recording medium connecting terminal;
   a first memory to store specific information to confirm whether or not specific data information or specific directory information is recorded in the recording medium;
   a judging section to compare the specific information with the data information or the directory information read from the recording medium, to judge whether or not the specific information conforms with the data information or the directory information, and to indicate a conforming case or a nonconforming case as a judgment result; and
   a controller to control a working mode such that a first working mode is conducted in the conforming case and a second working mode different from the first working mode is conducted in the nonconforming case when the data information recorded in the recording medium is handled from the external apparatus connected to the apparatus connecting terminal.

2. The data reading apparatus of claim 1, wherein when the data information recorded in the recording medium is handled from the external apparatus, the controller applies a limitation to the handling as a limiting mode which is conducted as one of the first working mode and the second working mode and does not apply the limitation to the handling as a non limiting mode which is conducted as the other one of the first working mode and the second working mode; and wherein the controller applies the limitation to the handling as the limiting mode in the conforming case and does not apply the limitation to the handling as the non limiting mode in the non conforming case.

3. The data reading apparatus of claim 2, further comprising:

a second memory to store limiting information regarding the limitation;

wherein the controller transmits the limiting information to the external apparatus on the limiting mode.

4. The data reading apparatus of claim 2, wherein the controller prohibits at least one of renewing the data information in a region of the recording medium indicated by the specific information and writing new data information in the region.

5. An image data reading apparatus, comprising:

an apparatus connecting terminal to which an external apparatus is connected;

a memory card connecting terminal to which a memory card is connected, wherein the memory card stores image data captured by a digital camera and directory data of the image data;

a reader to read the image data or the directory data stored in the memory card coupled to the memory card connecting terminal;

a first memory to store specific data to confirm whether or not specific image data or specific directory data are stored in the memory card;

a judging section to compare the specific data with the image data, information data of the image data or the specific directory data read from the memory card, to judge whether or not the specific data conforms with the image data, the information data of the image data or the specific directory data, and to indicate a conforming case or a nonconforming case as a judgment result; and a controller to control a working mode such that a first working mode is conducted in the conforming case and a second working mode different from the first working mode is conducted in the nonconforming case when data in the memory card are handled from the external apparatus.

6. The data reading apparatus of claim 5, wherein when the data stored in the memory card are handled from the external apparatus, the controller applies a limitation to the handling as a limiting mode which is conducted as one of the first working mode and the second working mode and does not apply the limitation to the handling as a non limiting mode which is conducted as the other one of the first working mode and the second working mode; and wherein the controller applies the limitation to the handling as the limiting mode in the conforming case and does not apply the limitation to the handling as the non limiting mode in the non conforming case.

7. The data reading apparatus of claim 6, further comprising:

a second memory to store limiting data regarding the limitation;

wherein the controller transmits the limiting data to the external apparatus on the limiting mode.

8. The data reading apparatus of claim 6, wherein the controller prohibits at least one of renewing the data in a region of the memory card indicated by the specific data and writing new data in the region.

9. The data reading apparatus of claim 5, wherein the external apparatus is a personal computer.

* * * * *